(12) United States Patent
Hazui et al.

(10) Patent No.: US 11,221,166 B2
(45) Date of Patent: Jan. 11, 2022

(54) REFRIGERATOR SYSTEM

(71) Applicant: MITSUBISHI HEAVY INDUSTRIES THERMAL SYSTEMS, LTD., Tokyo (JP)

(72) Inventors: Yusuke Hazui, Tokyo (JP); Toshiaki Ouchi, Tokyo (JP); Minoru Matsuo, Tokyo (JP); Satoshi Nikaido, Tokyo (JP); Noriyasu Maehara, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 200 days.

(21) Appl. No.: 15/736,559

(22) PCT Filed: Apr. 21, 2016

(86) PCT No.: PCT/JP2016/062645
§ 371 (c)(1),
(2) Date: Dec. 14, 2017

(87) PCT Pub. No.: WO2017/022282
PCT Pub. Date: Feb. 9, 2017

(65) Prior Publication Data
US 2018/0187938 A1 Jul. 5, 2018

(30) Foreign Application Priority Data

Jul. 31, 2015 (JP) .............................. JP2015-152177

(51) Int. Cl.
*F25B 49/02* (2006.01)
*F25B 1/10* (2006.01)
(Continued)

(52) U.S. Cl.
CPC .............. *F25B 49/022* (2013.01); *F25B 1/00* (2013.01); *F25B 1/10* (2013.01); *F25B 25/005* (2013.01);
(Continued)

(58) Field of Classification Search
CPC .. F25B 49/022; F25B 1/00; F25B 1/10; F25B 25/005; F25B 7/00; F25B 2339/047;
(Continued)

(56) References Cited

U.S. PATENT DOCUMENTS 8,984,904 B2   3/2015   Tamura et al.
9,341,401 B2   5/2016   Nikaido et al.
(Continued)

FOREIGN PATENT DOCUMENTS

CN   1637362 A    7/2005
CN   102124286 A  7/2011
(Continued)

OTHER PUBLICATIONS

Chinese Office Action and Search Report, dated Jul. 5, 2019, for Chinese Application No. 201680035315.7, with an English translation.
(Continued)

*Primary Examiner* — Tavia Sullens
(74) *Attorney, Agent, or Firm* — Birch, Stewart, Kolasch & Birch, LLP

(57) ABSTRACT

Provided is a refrigerator system with which refrigerators can be operated efficiently. This refrigerator system has: an upstream refrigerator having a first compressor that compresses a refrigerant, a first condenser that condenses the refrigerant compressed by the first compressor, and a first evaporator that evaporates the refrigerant condensed by the first condenser and cools cold water; a downstream refrigerator having a second compressor that compresses a refrig-
(Continued)

erant, a second condenser that condenses the refrigerant compressed by the second compressor, and a second evaporator that evaporates the refrigerant condensed by the second condenser and cools the cold water that has passed through the first evaporator; and a higher-level control device that controls the operation of the upstream refrigerator and the downstream refrigerator. The first compressor is a variable-speed device, and the second compressor is a constant-speed device.

6 Claims, 12 Drawing Sheets

(51) Int. Cl.
*F25B 25/00* (2006.01)
*F25B 1/00* (2006.01)

(52) U.S. Cl.
CPC ..... *F25B 2339/047* (2013.01); *F25B 2400/06* (2013.01); *F25B 2400/061* (2013.01); *F25B 2600/0251* (2013.01); *F25B 2600/0253* (2013.01)

(58) Field of Classification Search
CPC .......... F25B 2341/0662; F25B 2400/06; F25B 2400/061; F25B 2400/13; F25B 2400/16; F25B 2600/0251; F25B 2600/0253; F25B 2700/195; F25B 2700/197; F25B 2700/21161; F25B 2700/21172; F25B 2700/21173; F25B 2313/004; F25D 2313/004
See application file for complete search history.

(56) References Cited

U.S. PATENT DOCUMENTS

| | | | |
|---|---|---|---|
| 2005/0210901 A1* | 9/2005 | Nash, Jr. | F25B 49/022 62/228.5 |
| 2011/0146314 A1* | 6/2011 | Tamura | F25B 49/022 62/228.5 |
| 2011/0174005 A1* | 7/2011 | Takegami | F25B 1/10 62/228.1 |
| 2013/0098084 A1* | 4/2013 | Matsuo | F25B 49/00 62/129 |
| 2013/0125573 A1* | 5/2013 | Nikaido | F25B 49/022 62/229 |
| 2013/0145781 A1* | 6/2013 | Liu | F25B 49/022 62/115 |
| 2015/0241100 A1 | 8/2015 | Matsuo et al. | |

FOREIGN PATENT DOCUMENTS

| | | |
|---|---|---|
| CN | 103348196 A | 10/2013 |
| CN | 104620062 A | 5/2015 |
| EP | 1548377 B1 | 10/2013 |
| JP | 5-93550 A | 4/1993 |
| JP | 2010-71639 A | 4/2010 |
| JP | 2011153734 A * | 8/2011 |
| JP | 2012-141098 A | 7/2012 |
| JP | 2014-70741 A | 4/2014 |
| WO | WO 03/085334 A1 | 10/2003 |
| WO | WO 2008/138367 A1 | 11/2008 |
| WO | WO 2012/090579 A1 | 7/2012 |
| WO | WO 2014/050213 A1 | 4/2014 |

OTHER PUBLICATIONS

International Search Report and Written Opinion of the International Searching Authority (Forms PCT/ISA/220, PCT/ISA/210 and PCT/ISA/237) for Application No. PCT/JP2016/062645, dated Aug. 2, 2016, with an English translation.

Japanese Notification of Reasons for Refusal and English translation for Japanese Application No. 2015-152177, dated Nov. 21, 2017.

* cited by examiner

REFRIGERATOR SYSTEM

TECHNICAL FIELD

The present invention relates to a refrigerator system including two refrigerators.

BACKGROUND ART

A refrigerator system having refrigerators is used in load equipment such as air conditioning equipment of a building, refrigeration equipment, or freezing equipment. As the refrigeration system, a refrigeration system is known, in which two refrigerators configuring a refrigeration cycle are connected to each other in series and cold water supplied to load equipment is cooled by condensers of the two refrigerators. PTL 1 discloses a technology of setting an intermediate temperature such that an operation cost is a predetermined value or less with the intermediate temperature which is a temperature of a refrigerant (heat medium) which passes through an upstream refrigerator (upstream heat source machine) and flows into a downstream refrigerator (downstream heat source machine) as a control target.

CITATION LIST

Patent Literature

[PTL 1] Japanese Unexamined Patent Application Publication No. 2012-141098

SUMMARY OF INVENTION

Technical Problem

In a refrigeration system, an effective operation of a refrigerator reduces energy consumption. The present invention is made to achieve the above-described task, and an object thereof is to provide a refrigerator system in which a refrigerator can be effectively operated.

Solution to Problem

In order to achieve the above-described object, according to the present invention, there is provided a refrigerator system, including: an upstream refrigerator having a first compressor which compresses a refrigerant, a first condenser which condenses the refrigerant compressed by the first compressor, and a first evaporator which evaporates the refrigerant condensed by the first condenser to cool cold water; a downstream refrigerator having a second compressor which compresses a refrigerant, a second condenser which condenses the refrigerant compressed by the second compressor, and a second evaporator which evaporates the refrigerant condensed by the second condenser to cool cold water which passes through the first evaporator; and a higher-level control device which controls operations and stops of the upstream refrigerator and the downstream refrigerator and loads of the upstream refrigerator and the downstream refrigerator, in which the first compressor is a variable-speed device, and the second compressor is a constant-speed device.

Preferably, the higher-level control device sets a mode to a first mode in which the upstream refrigerator is operated and the downstream refrigerator is stopped in a case where an equipment load factor is smaller than a first threshold value, the higher-level control device sets a mode to a second mode in which both the upstream refrigerator and the downstream refrigerator are operated in a case where the equipment load factor is equal to or more than a second threshold value which is higher than the first threshold value in a state where the upstream refrigerator is operated and the downstream refrigerator is stopped, and the higher-level control device sets a mode to the first mode in a case where the equipment load factor is lower than the first threshold value in a state where both the upstream refrigerator and the downstream refrigerator are operated.

Preferably, the higher-level control device sets loads of the upstream refrigerator and the downstream refrigerator to loads of which differences with respect to an equal load are within 10% in a case where the equipment load factor exceeds the second threshold value in the first mode and an operation in the second mode starts.

Preferably, the higher-level control device sets loads of the upstream refrigerator and the downstream refrigerator to an equal load in a case where the equipment load factor exceeds the second threshold value in the first mode and an operation in the second mode starts.

Preferably, the higher-level control device sets a load factor of the downstream refrigerator to 100% and changes the load factor of the upstream refrigerator according to the equipment load factor in a case where the operation is performed in the second mode and the equipment load factor exceeds a third threshold value which is higher than the second threshold value.

Preferably, the second condenser performs heat exchange between supplied cooling water and the refrigerant to cool the refrigerant, the first condenser performs heat exchange between the cooling water which passes through the second condenser and the refrigerant to cool the refrigerant, a cooling-water temperature measuring unit which measures a temperature of the cooling water supplied to the second condenser is provided, and the higher-level control device adjusts the first threshold value based on the temperature measured by the cooling-water temperature measuring unit.

Preferably, the first threshold value becomes a lower equipment load factor as the temperature measured by the cooling-water temperature measuring unit is lower.

In order to achieve the above-described object, according to another aspect of the present invention, there is provided a refrigerator system, including: an upstream refrigerator having a first compressor which compresses a refrigerant, a first condenser which condenses the refrigerant compressed by the first compressor, and a first evaporator which evaporates the refrigerant condensed by the first condenser to cool cold water; a downstream refrigerator having a second compressor which compresses a refrigerant, a second condenser which condenses the refrigerant compressed by the second compressor, and a second evaporator which evaporates the refrigerant condensed by the second condenser to cool cold water which passes through the first evaporator; and a higher-level control device which controls operations and stops of the upstream refrigerator and the downstream refrigerator and loads of the upstream refrigerator and the downstream refrigerator, in which the first compressor is a variable-speed device, the second compressor is a constant-speed device, the higher-level control device sets a mode to a first mode in which the upstream refrigerator is operated and the downstream refrigerator is stopped in a case where an equipment load factor is smaller than a first threshold value, the higher-level control device sets a mode to a second mode in which both the upstream refrigerator and the downstream refrigerator are operated in a case where the equipment load factor is equal to or more than a second threshold value which is higher than the first threshold value in a state where the upstream refrigerator is operated and the downstream refrigerator is stopped, and the higher-level control device sets a mode to the first mode in a case where the equipment load factor is lower than the first threshold value in a state where both the upstream refrigerator and the downstream refrigerator are operated.

Preferably, in a case where the equipment load factor exceeds a third threshold value which is higher than the second threshold value in a state where both the upstream refrigerator and the downstream refrigerator are operated, according to an increase in the equipment load factor, a load factor of the upstream refrigerator increases in a state where the load of the downstream refrigerator is constant, the load factor of the upstream refrigerator becomes 100%, and thereafter, the load factor of the downstream refrigerator is changed.

Preferably, the second condenser performs heat exchange between supplied cooling water and the refrigerant to cool the refrigerant, the first condenser performs heat exchange between the cooling water which passes through the second condenser and the refrigerant to cool the refrigerant, a cooling-water temperature measuring unit which measures a temperature of the cooling water supplied to the second condenser is provided, and the higher-level control device adjusts the third threshold value based on the temperature measured by the cooling-water temperature measuring unit.

Preferably, the third threshold value becomes a lower equipment load factor as the temperature measured by the cooling-water temperature measuring unit is higher.

Advantageous Effects of Invention

According to the present invention, the refrigerator system in which the refrigerators can be effectively operated is provided.

DESCRIPTION OF EMBODIMENTS

Hereinafter, the present invention will be described in detail with reference to the drawings. In addition, the present invention is not limited by embodiments, and in a case where a plurality of embodiments are provided, the present invention includes configurations obtained by combining the embodiments. In addition, components described in the following embodiments include components which can be easily conceived by a person skilled in the art and the essentially same components.

First Embodiment

Figure 1:
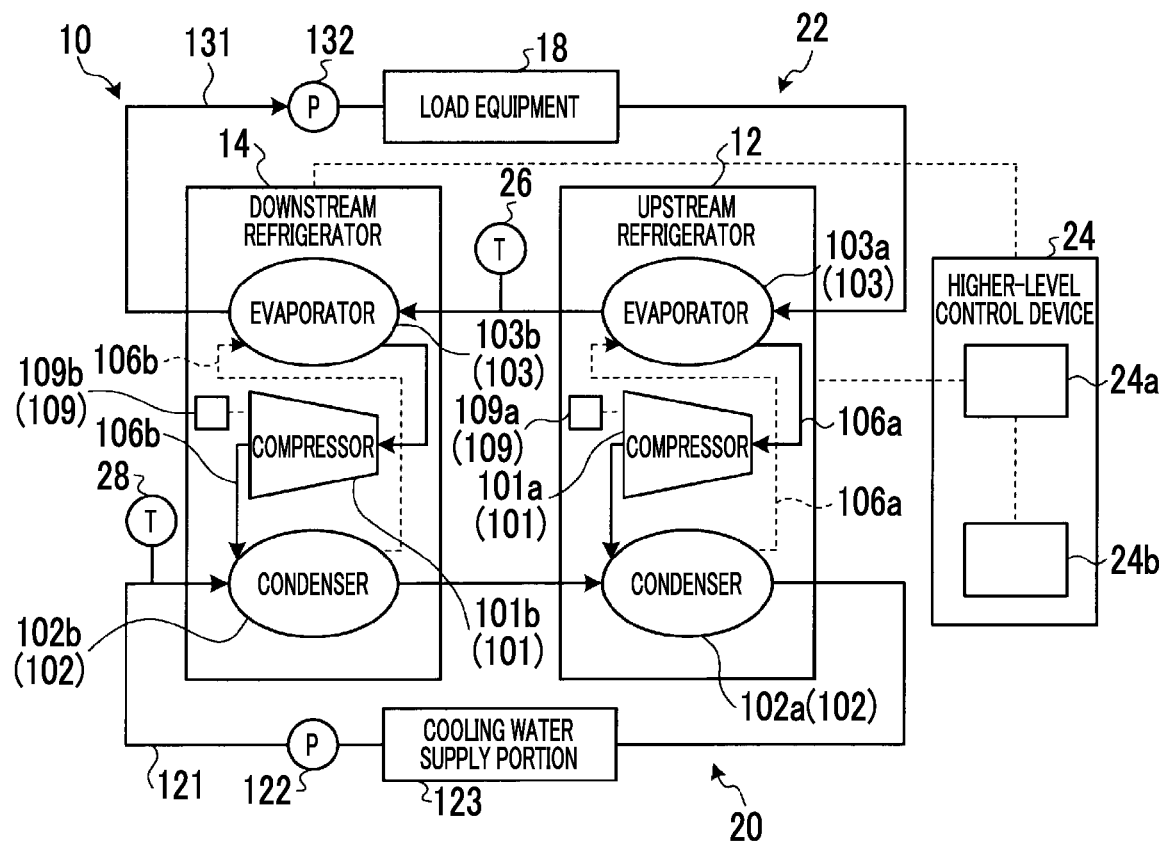
FIG. 1 is a block diagram showing a schematic configuration of a refrigeration system.

FIG. 1 is a block diagram showing a schematic configuration of a refrigeration system 10. The refrigeration system 10 includes an upstream refrigerator 12, a downstream refrigerator 14, a cooling water circulation system 20, a cold water circulation system 22, a higher-level control device 24, a cold-water intermediate temperature measuring unit 26, and an inlet cooling-water temperature measuring unit 28. Cold water is supplied to load equipment 18 by the refrigeration system 10.

The upstream refrigerator 12 cools the cold water supplied to the load equipment 18. The upstream refrigerator 12 cools the cold water using a refrigerant. The upstream refrigerator 12 includes a first compressor 101a which compresses the refrigerant, a first condenser 102a which condenses the refrigerant compressed by the first compressor 101a, a first evaporator 103a which evaporates the refrigerant condensed by the first condenser 102a to cool the cold water, and a first circulation path 106a. The first compressor 101a, the first condenser 102a, and the first evaporator 103a are connected to each other via the first circulation path 106a. The refrigerant of the upstream refrigerator 12 circulates through the first compressor 101a, the first condenser 102a, and the first evaporator 103a via the first circulation path 106a. A controller 109a controls an operation of each portion of the upstream refrigerator 12.

The downstream refrigerator 14 cools the cold water supplied to the load equipment 18. The downstream refrigeration 14 cools the cold water using a refrigerant. The downstream refrigerator 14 includes a second compressor 101b which compresses the refrigerant, a second condenser 102b which condenses the refrigerant compressed by the second compressor 101b, a second evaporator 103b which evaporates the refrigerant condensed by the second condenser 102b to cool the cold water which has passed through the first evaporator 103a, and a second circulation path 106b. The second compressor 101b, the second condenser 102b, and the second evaporator 103b are connected to each other via the second circulation path 106b. The refrigerant of the downstream refrigerator 14 circulates through the second compressor 101b, the second condenser 102b, and the second evaporator 103b via the second circulation path 106b. A controller 109b controls an operation of each portion of the downstream refrigerator 14.

For example, the load equipment 18 is air conditioning equipment which is installed in structures such as a building or a factory. The load equipment 18 cools an object using the cold water supplied from the upstream refrigerator 12 and the downstream refrigerator 14. For example, the load equipment 18 performs heat exchange between the supplied cold water and air and supplies the air cooled by the cold water to a building. Accordingly, a temperature or humidity of the building is adjusted.

In addition, the load equipment 18 may be refrigeration equipment or freezing equipment. Moreover, the load equipment 18 may perform heat exchange between the supplied cold water and a liquid and supply the liquid cooled by the cold water to an object.

The cooling water circulation system 20 supplies cooling water to the upstream refrigerator 12 and the downstream refrigerator 14 to cool the refrigerant of the upstream refrigerator 12 and the refrigerant of the downstream refrigerant 14. The cooling water cools the refrigerant which flows through the first condenser 102a of the upstream cooler 12 and the refrigerant which flows through the second condenser 102b of the downstream refrigerator 14.

The second condenser 102b performs heat exchange between the cooling water supplied from a cooling water supply portion 123 and the refrigerant to cool the refrigerant of the downstream refrigerator 14. The first condenser 102a performs heat exchange between the cooling water which has passed through the second condenser 102b and the refrigerant to cool the refrigerant of the upstream refrigerator 12.

The cooling water circulation system 20 includes a cooling water pipe 121, a pump 122, and the cooling water supply portion 123. The cooling water pipe 121 which is a pipeline through which the cooling water flows. The pump 122 is disposed in the cooling water pipe 121 between the cooling water supply portion 123 and the second condenser 102b. The cooling water supply portion 123 supplies the cooling water to the cooling water pipe 121 and recovers the cooling water which is heat-exchanged with the refrigerant.

The cooling water pipe 121 is connected to each of the first condenser 102a of the upstream refrigerator 12, the second condenser 102b of the downstream refrigerator 14, the pump 122, and the cooling water supply portion 123. The cooling water circulates through the first condenser 102a, the second condenser 102b, and the cooling water supply portion 123 via the cooling water pipe 121 by the operation of the pump 122.

In the cooling water circulation system 20, the cooling water supplied from the cooling water supply portion 123 flows to the second condenser 102b and the first condenser 102a, and thereafter, is returned to the cooling water supply portion 123. Accordingly, the refrigerant flowing through the second condenser 102b and the refrigerant flowing through the first condenser 102a are cooled by the cooling water.

The cold water circulation system 22 supplies the cold water cooled by the refrigerant of the upstream refrigerator 12 and the refrigerant of the downstream refrigerator 14 to the load equipment 18. In addition, the cold water circulation system 22 supplies the cold water which is heat-exchanged with air by the load equipment 18 to the upstream refrigerator 12 and the downstream refrigerator 14.

The cold water circulation system 22 includes a cold water pipe 131 and a pump 132. The cold water pipe 131 is a pipeline through which the cold water flows. The pump 132 is disposed in the cold water pipe 131 between the load equipment 18 and the second evaporator 103b.

The cold water pipe 131 is connected to each of the first evaporator 103a of the upstream refrigerator 12, the second evaporator 103b of the downstream refrigerator 14, the pump 132, and the load equipment 18. The cold water circulates through the first evaporator 103a, the second evaporator 103b, and the load equipment 18 via the cold water pipe 131 by the operation of the pump 132.

In the cold water circulation system 22, the cold water which is heat-exchanged by the load equipment 18 flows to the first evaporator 103a and the second evaporator 103b, and thereafter, is supplied to the load equipment 18. The cold water is cooled by the first evaporator 103a and the second evaporator 103b, and thereafter, is supplied to the load equipment 18.

The higher-level control device 24 includes a calculation unit which includes a processor such as a CPU and a storage unit which includes a memory such as a ROM or a RAM. The higher-level control device 24 controls operations and stops of the upstream refrigerator 12 and the downstream refrigerator 14 and loads (or load factors) of the upstream refrigerator 12 and the downstream refrigerator 14. The higher-level control device 24 includes an operating refrigerator number determination unit 24a and a load distribution determination unit 24b.

The operating refrigerator number determination unit 24a determines the number of the refrigerators to be operated of two refrigerators of the upstream refrigerator 12 and the downstream refrigerator 14, based on an equipment load factor required for the load equipment 18. The load distribution determination unit 24b sets the load factor or the load of the operated refrigerator. The load factor is a ratio of a current load when a rated load is set to 100%. In a case where the load factor is 0%, a target refrigerator is in a stopped state. In addition, the load is a real number of the output of the refrigerator. The load distribution determination unit 24b sets the load factor or the load of the operated refrigerator based on a required load of the load equipment. Moreover, the load distribution determination unit 24b adjusts the loads of the upstream refrigerator 12 and the downstream refrigerator 14 based on the operation states of the upstream refrigerator 12 or the downstream refrigerator 14 and the states of the cold water and the cooling water. For example, the load distribution determination unit 24b adjusts the load factor or the load of the upstream refrigerator 12 and the load factor or the load of the downstream refrigerator 14 such that each of the upstream refrigerator 12 and the downstream refrigerator 14 has the set load factor, based on measurement results of the cold-water intermediate temperature measuring unit 26.

The cold-water intermediate temperature measuring unit 26 measures the temperature of the cold water which flows through the cold water pipe 131. The cold-water intermediate temperature measuring unit 26 measures the temperature of the cold water in the cold water pipe 131 between the first evaporator 103a and the second evaporator 103b. The cold-water intermediate temperature measuring unit 26 measures the temperature of the cold water supplied to the second evaporator 103b.

The inlet cooling-water temperature measuring unit 28 measures the temperature of the cooling water which flows through the cooling water pipe 121. The inlet cooling-water temperature measuring unit 28 measures the temperature of the cooling water supplied to the second condenser 102b in the inlet of the second condenser 102b.

Figure 2:
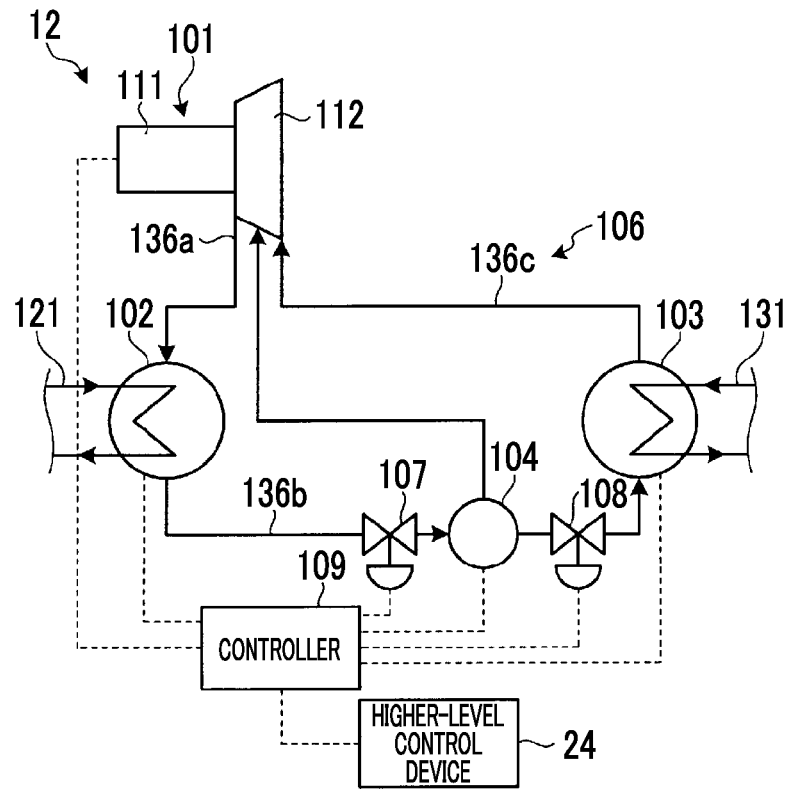
FIG. 2 is an explanatory diagram showing a schematic configuration of a refrigerator shown in FIG. 1.

FIG. 2 is a diagram showing a schematic configuration of the upstream refrigerator 12 according to the present embodiment. The downstream refrigerator 14 has the same configuration as that of the upstream refrigerator 12, and thus, descriptions of the downstream refrigerator 14 are omitted. In the following descriptions, the first compressor 101a, the first condenser 102a, the first evaporator 103a, the first circulation path 106a, and the controller 109a are respectively referred to as a compressor 101, a condenser 102, an evaporator 103, a circulation path 106, and a controller 109.

As shown in FIG. 2, the upstream refrigerator 12 includes the compressor 101, the condenser 102, the evaporator 103, an intermediate cooler 104, and the controller 109. The compressor 101 and the condenser 102 are connected to each other via a refrigerant pipe 136a. The condenser 102 and the evaporator 103 are connected to each other via a refrigerant pipe 136b. The evaporator 103 and the compressor 101 are connected to each other via a refrigerant pipe 136c. The intermediate cooler 104 is disposed in the refrigerant pipe 136b. The refrigerant flows through the refrigerant pipes 136a, 136b, and 136c. The circulation path 106 includes the refrigerant pipes 136a, 136b, and 136c.

The compressor 101, the condenser 102, the evaporator 103, and the intermediate cooler 104 are connected to each other via the circulation path 106 including the refrigerant pipes 136a, 136b, and 136c. The refrigerant circulates through the compressor 101, the condenser 102, the evaporator 103, and the intermediate cooler 104 via the circulation path 106.

In addition, the upstream refrigerator 12 includes an expansion valve (high stage expansion valve) 107 which is provided the refrigerant pipe 136b on the upstream side of the intermediate cooler 104 and an expansion valve (low stage expansion valve) 108 which is provided the refrigerant pipe 136b on the downstream side of the intermediate cooler 104.

The compressor 101 is a turbo compressor which compresses the refrigerant by a rotation of an impeller. The compressor 101 includes an electric motor 111 and a compression portion 112 including an impeller driven by the electric motor 111. The electric motor 111 includes a variable-speed device which can change a rotating speed per unit time by the control of an inverter and rotates the compression portion 112 at the changed rotating speed and a constant-speed device which rotates the compression portion 112 at a constant rotating speed.

The compression portion 112 may be a two-stage compression type compression portion coaxially having two impellers rotated by the electric motor 111 or may be a single-stage compression type compression portion having one impeller rotated by the electric motor 111. In a case where the compression portion 112 is a two-stage compression type compression portion, a gas-phase refrigerant supplied from the evaporator 103 to the compressor 101 is compressed by a first impeller, and thereafter, the refrigerant is further compressed by a second impeller, and the refrigerant is supplied to the condenser 102 via the refrigerant pipe 136a while the pressure and the temperature of the refrigerant increase. In a case where the compression portion 112 is a single-stage compression type compression portion, a gas-phase refrigerant supplied from the evaporator 103 to the compressor 101 is compressed by an impeller, and thereafter, the refrigerant is supplied to the condenser 102 via the refrigerant pipe 136a while the pressure and the temperature of the refrigerant increase.

The condenser 102 is connected to the cooling water pipe 121 to which the cooling water is supplied. The gas-phase refrigerant supplied from the compressor 101 to the condenser 102 is heat-exchanged with the cooling water supplied to the cooling water pipe 121 and is condensed to be liquefied. A liquid-phase refrigerant which is liquefied is supplied to the evaporator 103 via the refrigerant pipe 136b.

The evaporator 103 is connected to the cold water pipe 131 to which the cold water is supplied. The liquid-phase refrigerant supplied from the condenser 102 to the evaporator 103 is heat-exchanged with the cold water supplied to the cold water pipe 131 to be evaporated. The temperature of the cold water is decreased by the heat exchange between the cold water and the refrigerant. The liquid-phase refrigerant which is heat-exchanged with the cold water is evaporated to be vaporized. The gas-phase refrigerant which is vaporized is supplied to the compressor 101 via the refrigerant pipe 136c.

The intermediate cooler 104 separates the refrigerant which is liquefied by the condenser 102 and thereafter, passes through the expansion valve 107 into a liquid-phase refrigerant and a gas-phase refrigerant. The intermediate cooler 104 maintains a constant pressure difference between the condenser 102 and the evaporator 103 and vaporizes a portion of the liquid-phase refrigerant. A liquid-phase refrigerant and a gas-phase refrigerant which cannot be condensed in the condenser 102 are supplied to the intermediate cooler 104. The intermediate cooler 104 functions as a gas-liquid separator which separates the supplied liquid-phase refrigerant and gas-phase refrigerant from each other. The gas-phase refrigerant separated by the intermediate cooler 104 is supplied to the compressor 101. The liquid-phase refrigerant separated by the intermediate cooler 104 is supplied to the expansion valve 108. The refrigerant which has passed through the expansion valve 108 is supplied to the evaporator 103.

The expansion valve (high stage expansion valve) 107 expands the refrigerant liquefied by the condenser 102. The expansion valve 107 decreases the pressure of the refrigerant from a condensation pressure to an intermediate pressure. The refrigerant decompressed by the expansion valve 107 is supplied to the intermediate cooler 104.

The expansion valve (low stage expansion valve) 108 expands the liquid refrigerant (saturated liquid refrigerant) which has passed the intermediate cooler 104. The expansion valve 108 decreases the pressure of the refrigerant from an intermediate pressure to an evaporation pressure. The refrigerant decompressed by the expansion valve 108 is supplied to the evaporator 103.

The controller 109 controls the upstream refrigerator 12 including the compressor 101, the condenser 102, the evaporator 103, the intermediate cooler 104, the expansion valve 107, and the expansion valve 108, based on an instruction input from the higher-level control device 24. For example, the controller 109 of the upstream refrigerator 12 adjusts the operation of the upstream refrigerator 12 such that the upstream refrigerator 12 has the load factor set by the higher-level control device 24, based on the measurement results of the cold-water intermediate temperature measuring unit 26. For example, the higher-level control device 24 sets "downstream distribution load/(cold water flow rate× specific heat)+water supply temperature set value" to a target temperature of the intermediate water supply temperature and sends this to the controller 109 of the upstream refrigerator 12. The controller 109 of the upstream refrigerator 12 controls the operation of the upstream refrigerator 12 such that the intermediate water supply temperature has a target temperature. The controller 109 of the downstream refrigerator 14 controls the operation of each portion of the downstream refrigerator 14 based on the instruction input from the higher-level control device 24.

Figure 3:
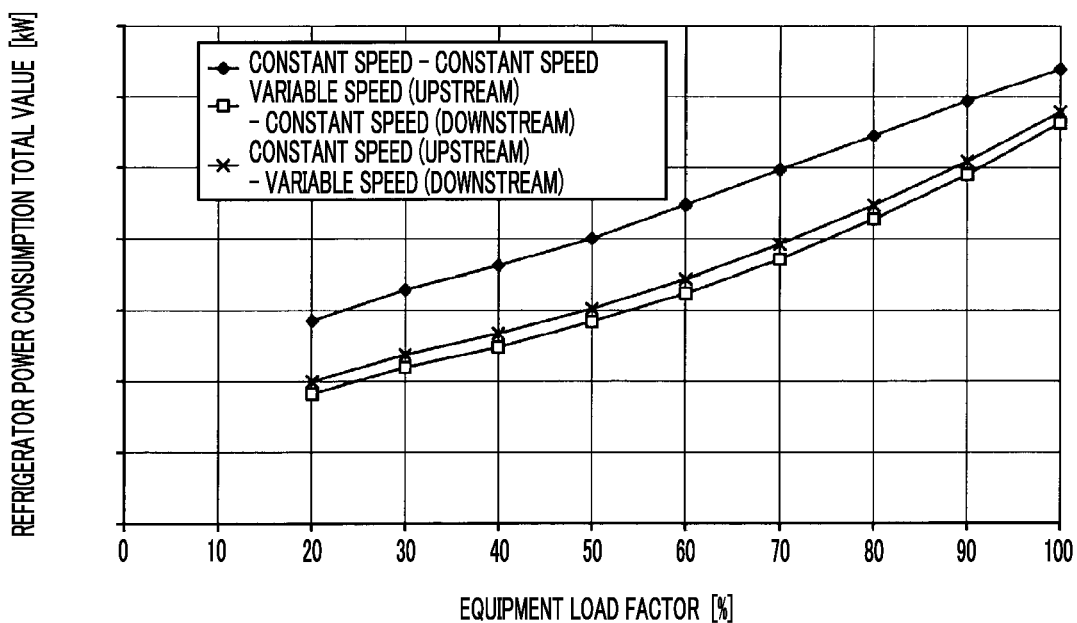
FIG. 3 is a graph showing a relationship between a combination of the refrigerators of the refrigeration system and power consumption.

FIG. 3 is a graph showing a relationship between a combination of the refrigerators of the refrigeration system 10 and power consumption. As shown in FIG. 3, compared to a case where the first compressor 101*a* is set to the constant-speed device and the second compressor 101*b* is set to the constant-speed device and a case where the first compressor 101*a* is set to the constant-speed device and the second compressor 101*b* is set to the variable-speed device, in a case where the first compressor 101*a* of the upstream refrigerator 12 is set to the variable-speed device and the second compressor 101*b* of the downstream refrigerator 14 is set to the constant-speed device, the power consumption of the refrigeration system 10 decreases.

Moreover, in the refrigeration system 10, compared to a case where the first compressor 101*a* of the upstream refrigerator 12 is set to the variable-speed device and the second compressor 101*b* of the downstream refrigerator 14 is set to the variable-speed device, in a case where the first compressor 101*a* of the upstream refrigerator 12 is set to the variable-speed device and the second compressor 101*b* of the downstream refrigerator 14 is set to the constant-speed device, that is, in a case where one refrigerator is set to the constant-speed device, a cost of the device decreases.

As described above, in the refrigerator system 10 according to the present embodiment, preferably, the first compressor 101*a* of the upstream refrigerator 12 is set to the variable-speed device and the second compressor 101*b* of the downstream refrigerator 14 is set to the constant-speed device. Accordingly, it is possible to decrease the power consumption of the refrigeration system 10 while decreasing an increase in the cost of the device.

In the refrigerator system 10, a water supply temperature of the upstream refrigerator 12 is higher than a water supply temperature of the downstream refrigerator 14. Rated capacity of the upstream refrigerator 12 is higher than rated capacity of the downstream refrigerator 14. Accordingly, in a case where an equipment load is distributed to the upstream refrigerator 12 and the downstream refrigerator 14, the load factor of the upstream refrigerator 12 is smaller than that of the downstream refrigerator 14. Therefore, in a case where the equipment load is equally distributed to each of the upstream refrigerator 12 and the downstream refrigerator 14, the upstream refrigerator 12 becomes a low load factor and the downstream refrigerator 14 becomes a high load factor.

In the refrigerator system 10, in a case where the refrigerator (the refrigerator of which the compressor is the variable-speed device) of a variable-speed device having excellent partial load characteristics is installed as the upstream refrigerator 12 and the refrigerator (the refrigerator of which the compressor is the variable-speed device) of the constant-speed device having excellent efficiency of the rated load is installed as the downstream refrigerator 14, the efficiency of each of the upstream refrigerator 12 and the downstream refrigerator 14 is improved.

Figure 4:
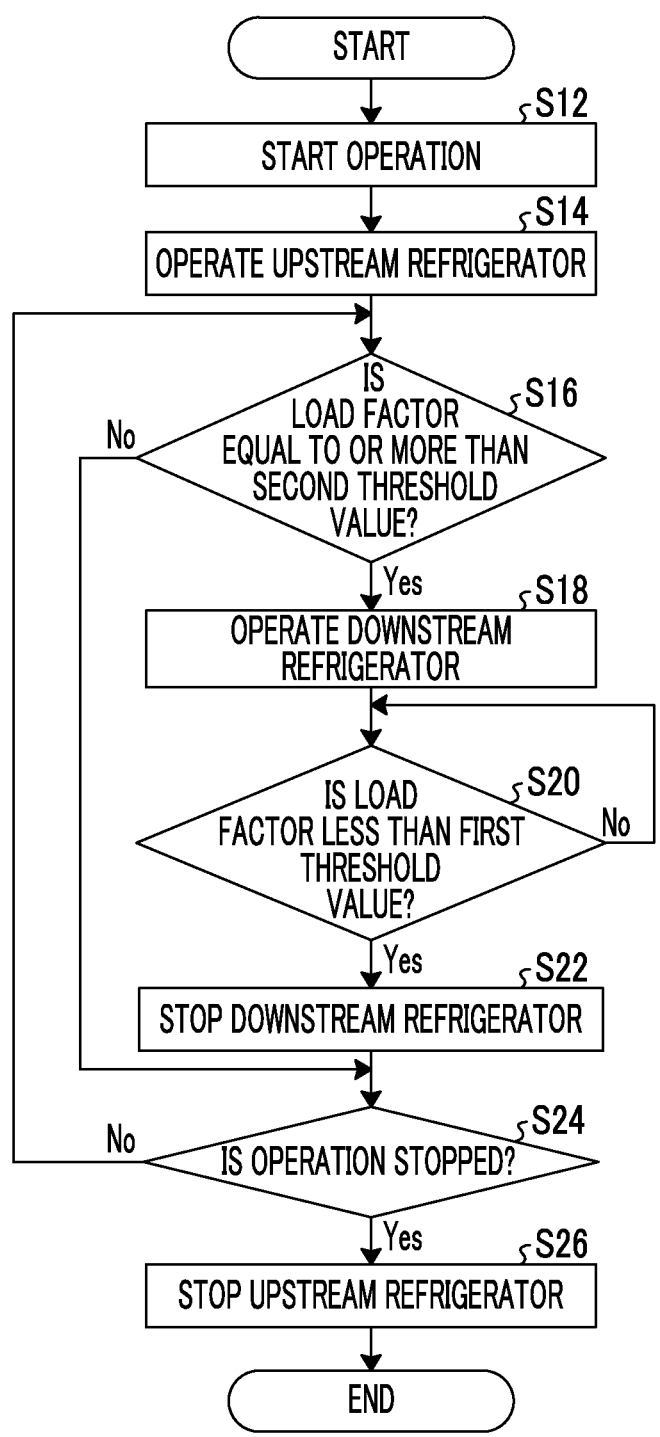
FIG. 4 is a flowchart showing an example of a processing operation of the refrigeration system.
Figure 5:
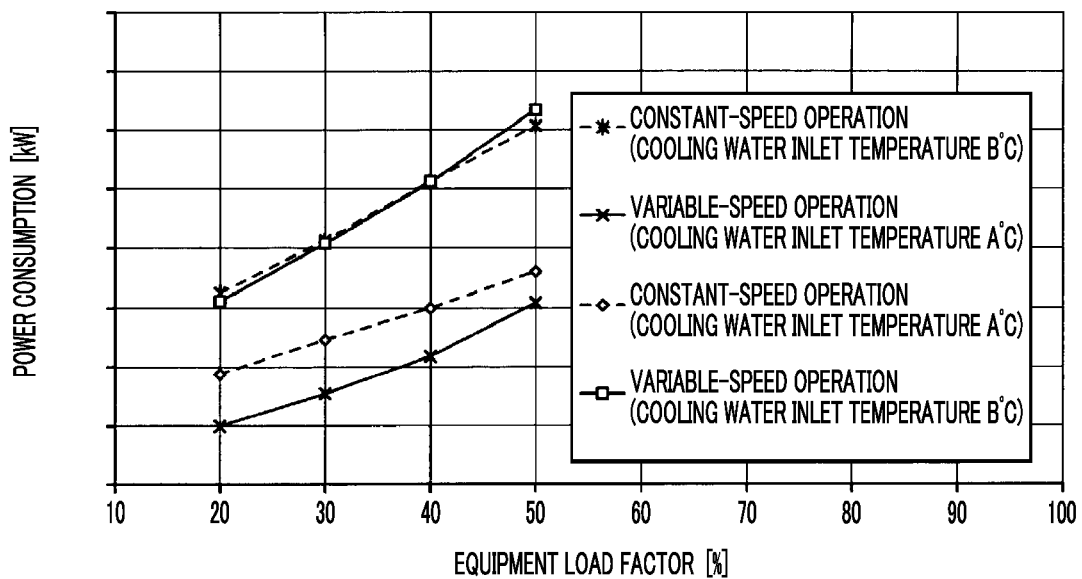
FIG. 5 is a graph showing a relationship between an equipment load factor and the power consumption.
Figure 6:
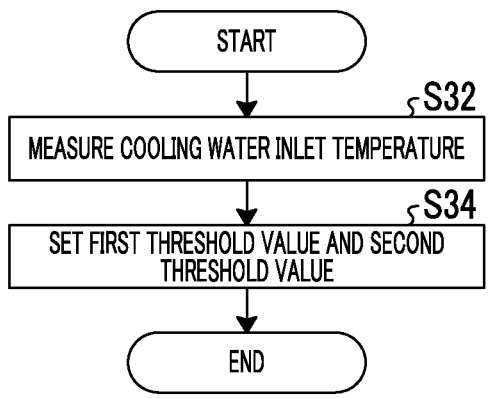
FIG. 6 is a flowchart showing an example of the processing operation of the refrigeration system.
Figure 7:
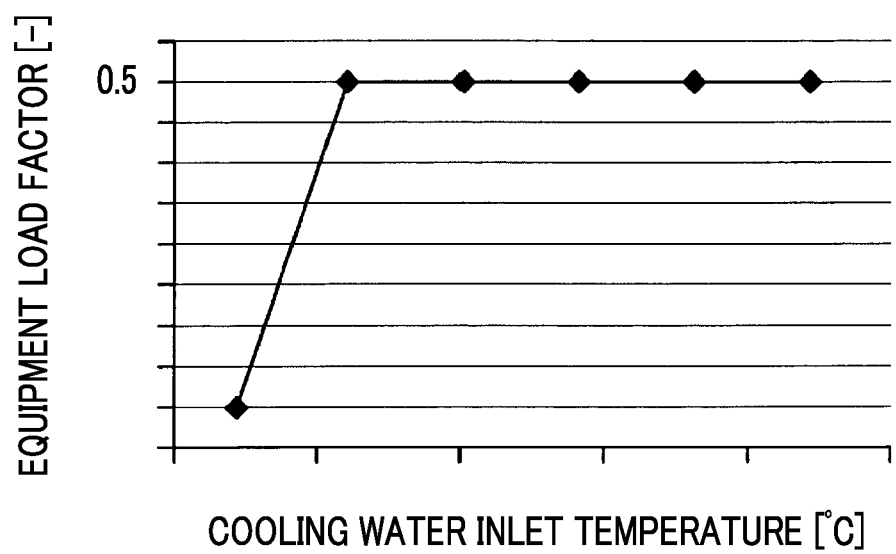
FIG. 7 is a graph showing a relationship between a first threshold value, the equipment load factor, and a cooling water inlet temperature.
Figure 8:
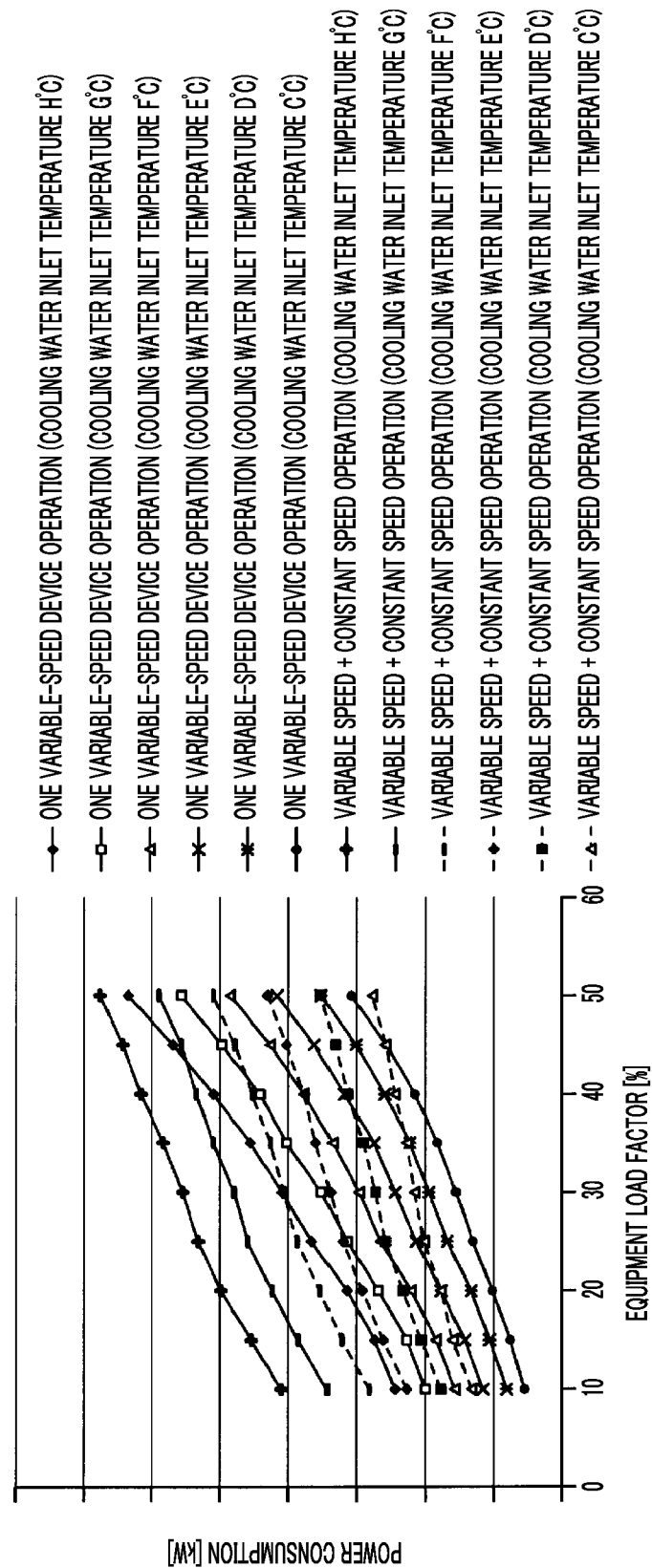
FIG. 8 is a graph showing a relationship between the combination of the refrigerators, the equipment load factor, and the power consumption.
Figure 9:
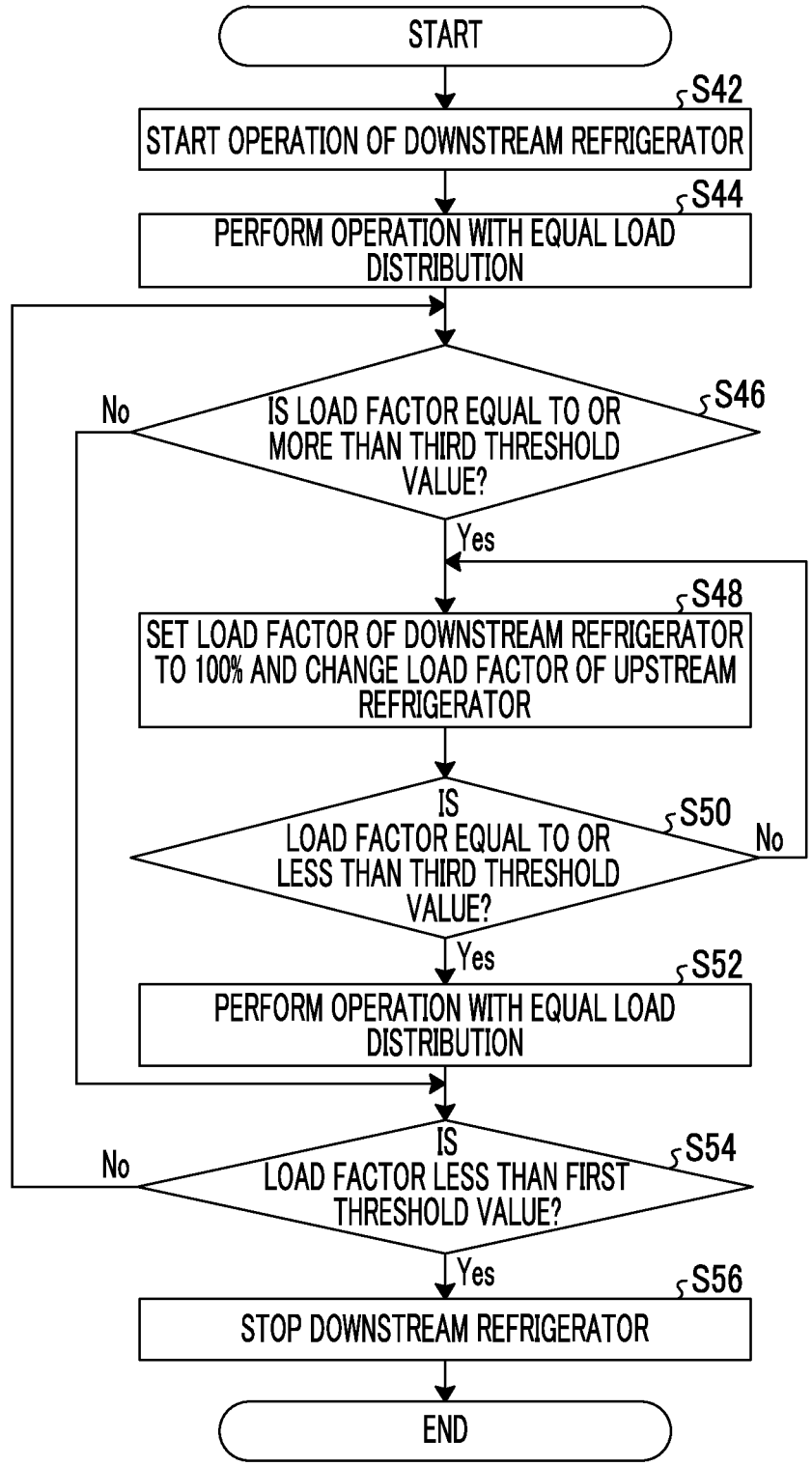
FIG. 9 is a flowchart showing an example of the processing operation of the refrigeration system.
Figure 10:
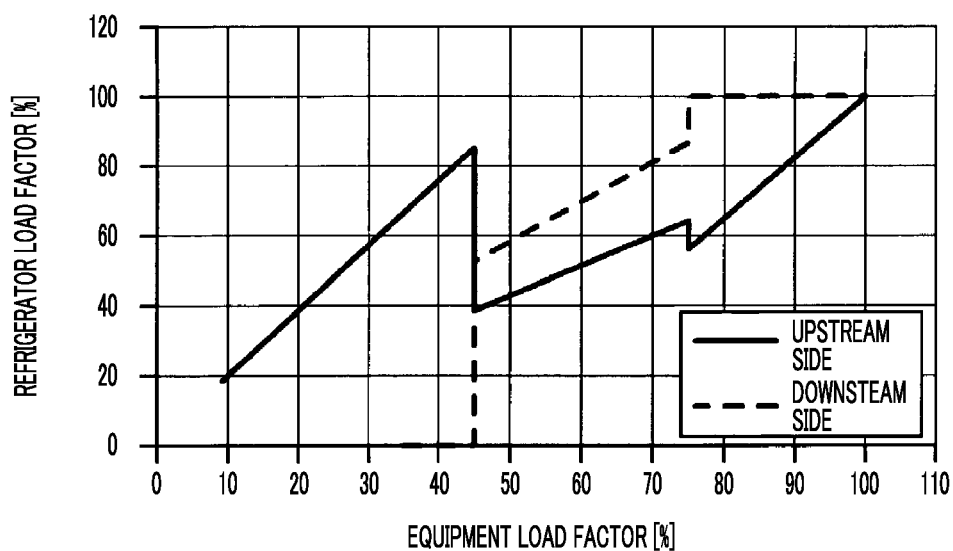
FIG. 10 is an explanatory diagram for explaining a control of a load factor of the refrigerator.
Figure 11:
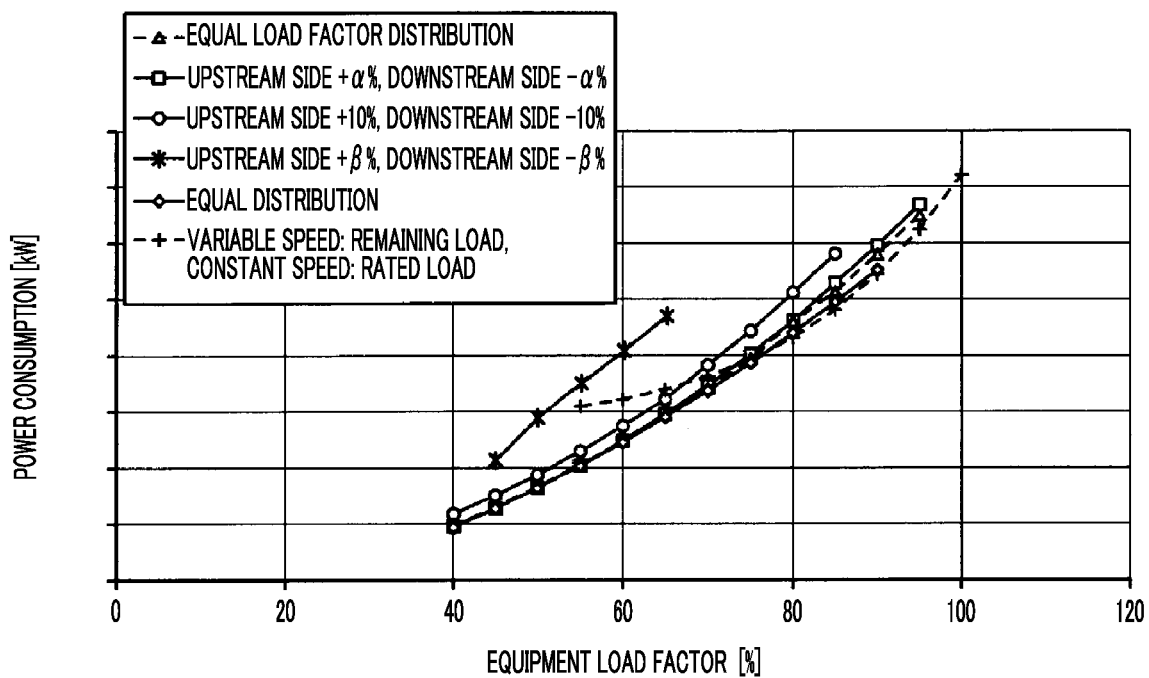
FIG. 11 is a graph showing a relationship between the load factor of the refrigerator, the equipment load factor, and the power consumption.

Next, a processing operation of the refrigerator system 10 will be described using FIGS. 4 to 11. FIG. 4 is a flowchart showing an example of the processing operation of the refrigeration system 10. FIG. 5 is a graph showing a relationship between the equipment load factor and the power consumption. FIG. 6 is a flowchart showing an example of the processing operation of the refrigeration system 10. FIG. 7 is a graph showing a relationship between a first threshold value, the equipment load factor, and a cooling water inlet temperature. FIG. 8 is a graph showing a relationship between the combination of the refrigerators, the equipment load factor, and the power consumption. FIG. 9 is a flowchart showing an example of the processing operation of the refrigeration system 10. FIG. 10 is an explanatory diagram for explaining a control of a load factor of the refrigerator. FIG. 11 is a graph showing a relationship between the load factor of the refrigerator, the equipment load factor, and the power consumption. The example shown in FIGS. 4 to 11 is an example of processing which can be suitably used in a case where the first compressor 101*a* of the upstream refrigerator 12 is a variable-speed device and the second compressor 101*b* of the downstream refrigerator 14 is a constant-speed device.

FIG. 4 shows processing until the operation of the refrigerator system 10 is stopped after the operation thereof starts in a state where the refrigerator system 10 is stopped. In a case where the equipment load factor is low, the higher-level control device 24 sets a mode to a first mode in which the upstream refrigerator 12 is operated and the downstream refrigerator 14 is stopped. In a case where the equipment load factor is high, the higher-level control device 24 sets a mode to a second mode in which both the upstream refrigerator 12 and the downstream refrigerator 14 are operated.

The equipment load factor is the entire load factor of the refrigerator system 10. In a case where the load factor of two refrigerators is 100%, the equipment load factor also is 100%.

In a case where the equipment load factor is lower than a first threshold value, the higher-level control device 24 switches the mode from the second mode in which both the upstream refrigerator 12 and the downstream refrigerator 14 are operated to the first mode in which the upstream refrigerator 12 is operated and the downstream refrigerator 14 is stopped. In a case where the equipment load factor is higher than a second threshold value, the higher-level control device 24 switches the mode from the first mode in which the upstream refrigerator 12 is operated and the downstream refrigerator 14 is stopped to the second mode in which both the upstream refrigerator 12 and the downstream refrigerator 14 are operated. The second threshold value is a higher value than the first threshold value.

The operation of the refrigerator system 10 starts (Step S12). The higher-level control device 24 operates the upstream refrigerator 12 (Step S14). The higher-level control device 24 sends the instruction of the operation to the controller 109 of the upstream refrigerator 12. The controller 109 of the upstream refrigerator 12 operates each portion of the upstream refrigerator 12 based on the instruction input from the higher-level control device 24. The higher-level control device 24 maintains the state of the first mode in which the upstream refrigerator 12 is operated and the downstream refrigerator 14 is stopped in a period after the operation starts in a state where the load is low. In a case where there is a difference between a required load factor and a current equipment load factor of the load equipment 18, the higher-level control device 24 changes the load at a set change ratio to bring the current equipment load factor closer to the required load factor of the load equipment 18.

The higher-level control device 24 determines whether or not the equipment load factor is equal to or more than the second threshold value in the state of the first mode in which the upstream refrigerator 12 is operated and the downstream refrigerator 14 is stopped (Step S16). In a case where the higher-level control device 24 determines that the equipment load factor is not equal to or more than the second threshold value (No in Step S16), that is, the equipment load factor is less than the second threshold value, the step proceeds to Step S24.

In a case where the higher-level control device 24 determines that the equipment load factor is equal to or more than the second threshold value (Yes in Step S16), the higher-level control device 24 operates the downstream refrigerator 14 (Step S18). That is, the higher-level control device 24 sets the mode to the second mode in which both the upstream refrigerator 12 and the downstream refrigerator 14 are operated. The higher-level control device 24 sends the instruction of the operation to the controller 109 of the downstream refrigerator 14. The controller 109 of the downstream refrigerator 14 operates each portion of the downstream refrigerator 14 based on the instruction input from the higher-level control device 24.

The higher-level control device 24 determines whether or not the equipment load factor is less than the first threshold value in the state where both the upstream refrigerator 12 and the downstream refrigerator 14 are operated (Step S20). In a case where the higher-level control device 24 determines that the equipment load factor is not less than the first threshold value (No in Step S20), that is, the equipment load factor is equal to or more than the first threshold value, the step is returned to Step S20.

In a case where the higher-level control device 24 determines that the equipment load factor is less than the first threshold value (Yes in Step 20), that is, the equipment load factor is lower than the first threshold value, the higher-level control device 24 stops the downstream refrigerator 14 (Step S22). That is, the higher-level control device 24 sets the mode to the first mode in which the upstream refrigerator 12 is operated and the downstream refrigerator 14 is stopped.

In a case where No is determined in Step S16 or in a case where the processing of Step S22 is performed, that is, in a case where the first mode in which the upstream refrigerator 12 is operated and the downstream refrigerator 14 is stopped is set, the higher-level control device 24 determines whether or not the operation is stopped (Step S24). In a case where the higher-level control device 24 determines that the operation is not stopped (No in Step S24), the higher-level control device 24 returns the step to Step S16 and performs the processing of Step S16. In a case where the higher-level control device 24 determines that the operation is stopped (Yes in Step S24), the higher-level control device 24 stops the upstream refrigerator 12 (Step S26) and ends the processing.

The higher-level control device 24 sets the first threshold value and the second threshold value and switches the number of the operated refrigerators, and thus, the higher-level control device 24 can prevent hunting due to a dead zone from occurring. In addition, as shown in FIG. 5, if the refrigerator of the variable-speed device and the refrigerator of the constant-speed device are compared with each other, the power consumption of the refrigerator of the variable-speed device is smaller than that of the refrigerator of the constant-speed device at the same equipment load. FIG. 5 shows a case where the cooling water inlet temperature is A° C. and the cooling water inlet temperature is B° C. In A° C. and B° C., B° C. is higher than A° C., that is, A<B is satisfied. Accordingly, in a case where one refrigerator is operated, it is possible to perform the operation with less power consumption by operating the upstream refrigerator 12 of the variable-speed device.

In addition, in a case where the first compressor 101a of the upstream refrigerator 12 is set to the constant-speed device and the second compressor 101b of the downstream refrigerator 14 is set to the variable-speed device, when any one of two refrigerators is operated, it is possible to perform the operation with less power consumption by operating the downstream refrigerator 14 of the variable-speed device.

Preferably, the higher-level control device 24 adjusts the first threshold value and the second threshold value based on the cooling water inlet temperature measured by the inlet cooling-water temperature measuring unit 28. As shown in FIG. 6, the higher-level control device 24 detects the cooling water inlet temperature by the inlet cooling-water temperature measuring unit 28 (Step S32) and sets the first threshold value and the second threshold value based on the detected temperature (step S34). As shown in FIG. 7, the higher-level control device 24 stores a relationship between the cooling water inlet temperature and the equipment load factor (threshold value) and sets the first threshold value and the second threshold value based on the cooling water inlet temperature. The first threshold value and the second threshold value increases as the cooling water inlet temperature increases. That is, as the temperature measured by the cooling-water temperature measuring unit 28 is lower, each of the first threshold value and the second threshold value have a lower equipment load factor.

Here, FIG. 8 shows the relationship between the power consumption and the equipment load factor in cases where the cooling water inlet temperature is C° C., D° C., E° C., F° C., G° C., and H° C. The temperature rises in the order of C° C., D° C., E° C., F° C., G° C., and H° C. That is, C<D<E<F<G<H is satisfied. As shown in FIG. 8, the equipment load factor in which the power consumption in a state where two devices are operated (variable-speed device+constant-speed device are operated) is lower than the power consumption in a state where one device is operated (one variable-speed device is operated) increases as the temperature increases. Accordingly, the first threshold value and the second threshold value increase as the cooling water inlet temperature increases, and thus, it is possible to effectively perform the operation. In addition, the first threshold value and the second threshold value may be set such that the equipment load factor in which the power consumption in a state where two devices are operated (variable-speed device+constant-speed device are operated) is lower than the power consumption in a state where one device is operated (one variable-speed device is operated) is interposed therebetween, or may be set such that one of the first threshold value and the second threshold value overlaps the equipment load factor.

Next, an example of a control in a state where two refrigerators are operated will be described using FIG. 9. In a case where the state where one refrigerator is operated is switched to the state where two refrigerators are operated, that is, in a case where the equipment load factor exceeds the second threshold value in the first mode, the higher-level control device 24 starts the operation of the downstream refrigerator 14 to set the mode to the second mode (Step S42). In a case where the second mode in which both the upstream refrigerator 12 and the downstream refrigerator 14 are operated is set, the higher-level control device 24 performs the operation with an equal load distribution (Step S44). That is, in a case where the equipment load factor exceeds the second threshold value in the first mode and the operation in the second mode starts, the higher-level control device 24 causes the loads of the upstream refrigerator 12 and the downstream refrigerator 14 to be the equal load. The higher-level control device 24 causes the load of the upstream refrigerator 12 and the load of the downstream refrigerator 14 to be the same as each other and performs the operation.

Next, the higher-level control device 24 determines that the equipment load factor is equal to or more than a third threshold value in a state where the operation is performed with the equal load distribution (Step S46). The third threshold value is a higher value than the second threshold value.

In a case where the higher-level control device 24 determines that the equipment load factor is not equal to or more than the third threshold value (No in Step S46), the step proceeds to Step S54. In a case where the higher-level control device 24 determines that the equipment load factor is equal to or more than the third threshold value (Yes in Step S46), the higher-level control device 24 sets the load factor of the downstream refrigerator 14 to 100% and variably sets the load factor of the upstream refrigerator 12 (Step S48). That is, in a case where the operation is performed in the second mode and the equipment load factor exceeds the third threshold value which is higher than the second threshold value, the higher-level control device 24 sets the load factor of the downstream refrigerator 14 to 100% and changes the load factor of the upstream refrigerator 12 according to the equipment load factor. The higher-level control device 24 sets the downstream refrigerator 14 to a constant load (rated load) and changes the load factor of the upstream refrigerator 12 according to the equipment load factor.

In a state where the higher-level control device 24 sets the load factor of the downstream refrigerator 14 to 100% and variably sets the load factor of the upstream refrigerator 12, the higher-level control device 24 determines whether or not the load factor (equipment load factor) is equal to or less than the third threshold value (Step S50). In a case where the higher-level control device 24 determines the load factor is not equal to or less than the third threshold value (No in Step S50), that is, in a case where the higher-level control device 24 determines that the load factor is higher than the third threshold value, the step returns to Step S48.

In a case where the higher-level control device 24 determines the load factor is equal to or less than the third threshold value (Yes in Step S50), the higher-level control device 24 performs the operation with the equal load distribution (Step S52). The higher-level control device 24 determines whether or not the load factor is less than the first threshold value in a state where the operation is performed with the equal load distribution (Step S54). In a case where the higher-level control device 24 determines that the load factor is not less than the first threshold value (No in Step S54), the step returns to Step S46. In a case where the higher-level control device 24 determines that the load factor is less than the first threshold value (Yes in Step S54), the higher-level control device 24 stops the downstream refrigerator 14 (Step S56).

The higher-level control device 24 performs the processing shown in FIG. 9, and thus, as shown in FIG. 10, the higher-level control device 24 performs the operation to change the load factor of each refrigerator according to an increase of the equipment load factor. The higher-level control device 24 operates only the upstream refrigerator 12 in a state where the equipment load factor is low. In this state, if the equipment load factor is equal to or more than the second threshold value, the higher-level control device 24 starts the operation of the downstream refrigerator 14. If the operations of two refrigerators start, the operations are performed at an equally distributed load. Since the loads of 100% of the upstream refrigerator 12 and the downstream refrigerator 14 are different from each other, if the same load as each other is distributed, the upstream refrigerator 12 and the downstream refrigerator 14 have load factors different from each other. In FIG. 10, the load factor of the downstream refrigerator 14 is higher than the load factor of the upstream refrigerator 12. If the equipment load factor is equal to or more than the third threshold value, the higher-level control device 24 sets the load factor of the downstream refrigerator 14 to 100% and adjusts the load factor of the upstream refrigerator 12.

The higher-level control device 24 performs the equal load distribution when the first mode in which the operation is performed by one refrigerator is switched to the second mode in which the operation is performed by two refrigerators, and thus, as shown in FIG. 11, it is possible to reduce the power consumption compared to a case where the downstream refrigerator 14 of the constant-speed device is set to a rated load and remaining loads are distributed to the upstream refrigerator 12 of the variable-speed device. Here, FIG. 11 shows measurement results in cases where the load of the upstream refrigerator 12 and the load of the downstream refrigerator 14 have the load factor equal to each other and are distributed with the equal load. In addition, FIG. 11 shows measurement results in a case where the load of the upstream refrigerator 12 which is a variable-speed device is variable and the load of the downstream refrigerator 14 which is a constant-speed device is a rated load. In addition, FIG. 11 shows measurement results in a case where the load of the upstream refrigerator 12 is set to a load of which a difference with respect to an equal load becomes +α% and the load of the downstream refrigerator 14 is set to a load of which a difference with respect to the equal load becomes −α%, in a case where the load of the upstream refrigerator 12 is set to a load of which a difference with respect to the equal load becomes +10% and the load of the downstream refrigerator 14 is set to a load of which a difference with respect to the equal load becomes −10%, and in a case where the load of the upstream refrigerator 12 is set to a load of which a difference with respect to the equal load becomes +β% and the load of the downstream refrigerator 14 is set to a load of which a difference with respect to the equal load becomes −β%. A relationship between α%, 10%, and β% satisfies α<10<β.

In the above-described embodiment, when the first mode which is the state operated by one refrigerator is switched to the second mold which is the state operated by two refrigerators, the operation is performed with an equally distributed load. However, the present invention is not limited to this. In a case where the equipment load factor exceeds the second threshold value in the first mode and the operation in the second mode starts, the higher-level control device 24 sets the loads of the upstream refrigerator 12 and the downstream refrigerator 14 to loads of which differences with respect to the equal load becomes within 10%, that is, in a state where the case in which the loads of the upstream refrigerator 12 and the downstream refrigerators 14 are the equal load is set to a reference load, the higher-level control device 24 sets the loads of the upstream refrigerator 12 and the downstream refrigerator 14 to a load which is the reference load×0.9 or more and reference load×1.1 or less. Accordingly, as shown in the case of 10% and in the case of α% of FIG. 11, compared to a case where the downstream refrigerator 14 (the second compressor is the downstream refrigerator 14 of the constant-speed device) of the constant-speed device is set to the rated load and the remaining loads are distributed to the upstream refrigerator 12 (the first compressor is the upstream refrigerator 12 of the variable-speed device) of the variable-speed device, it is possible to reduce the power consumption and it is possible to effectively perform the operation.

Second Embodiment

Figure 12:
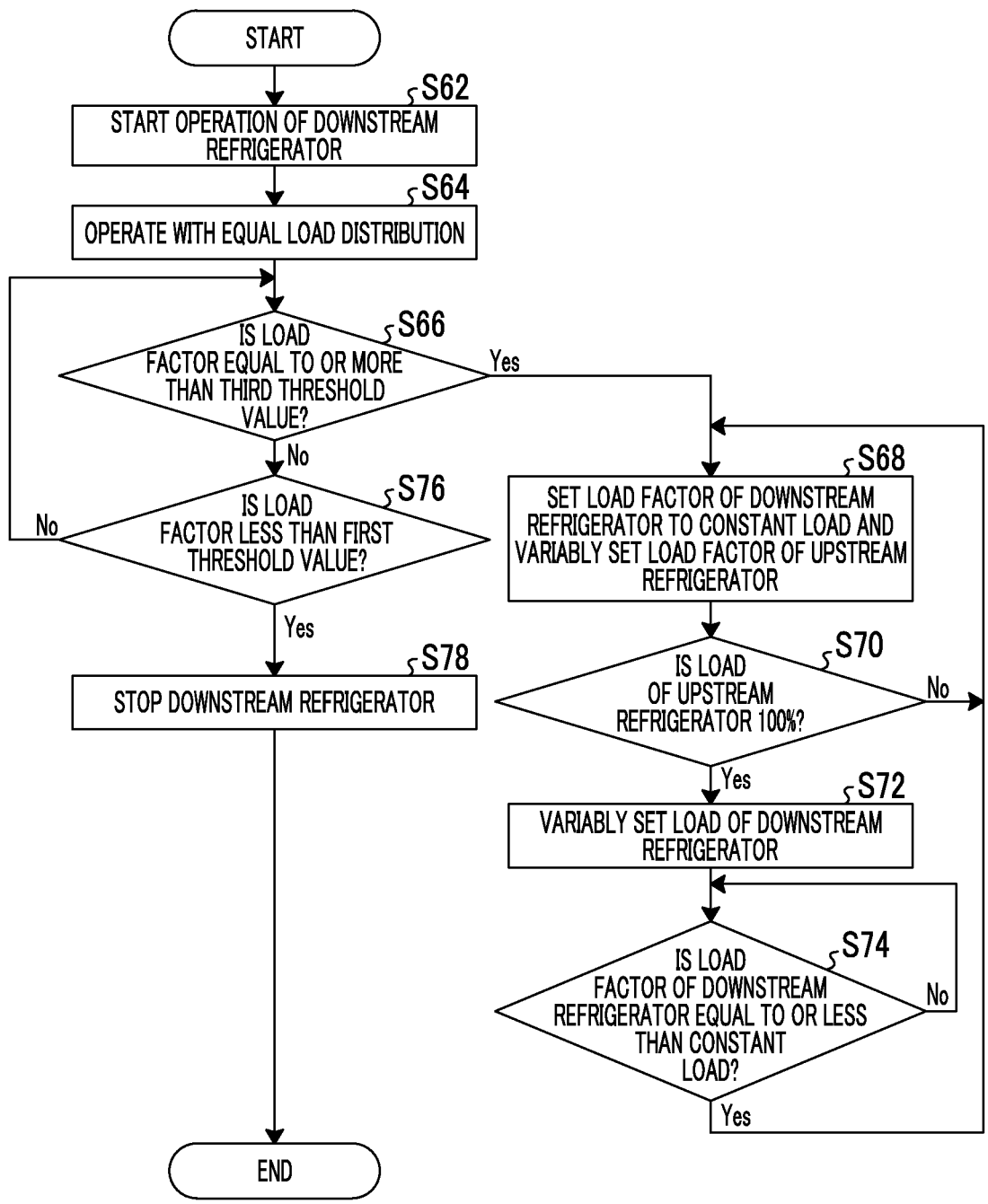
FIG. 12 is a flowchart showing an example of the processing operation of the refrigeration system.
Figure 13:
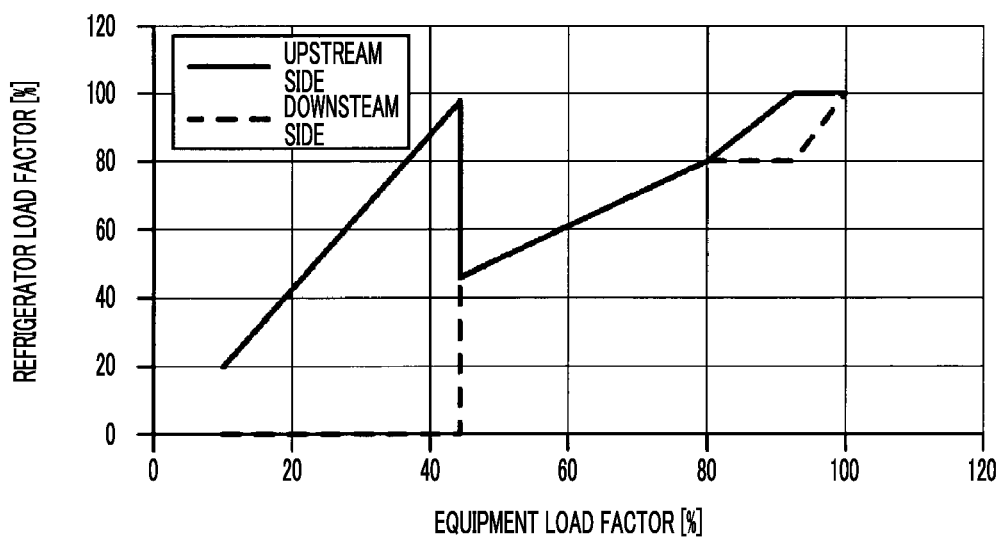
FIG. 13 is an explanatory diagram for explaining the control of the load factor of the refrigerator.
Figure 14:
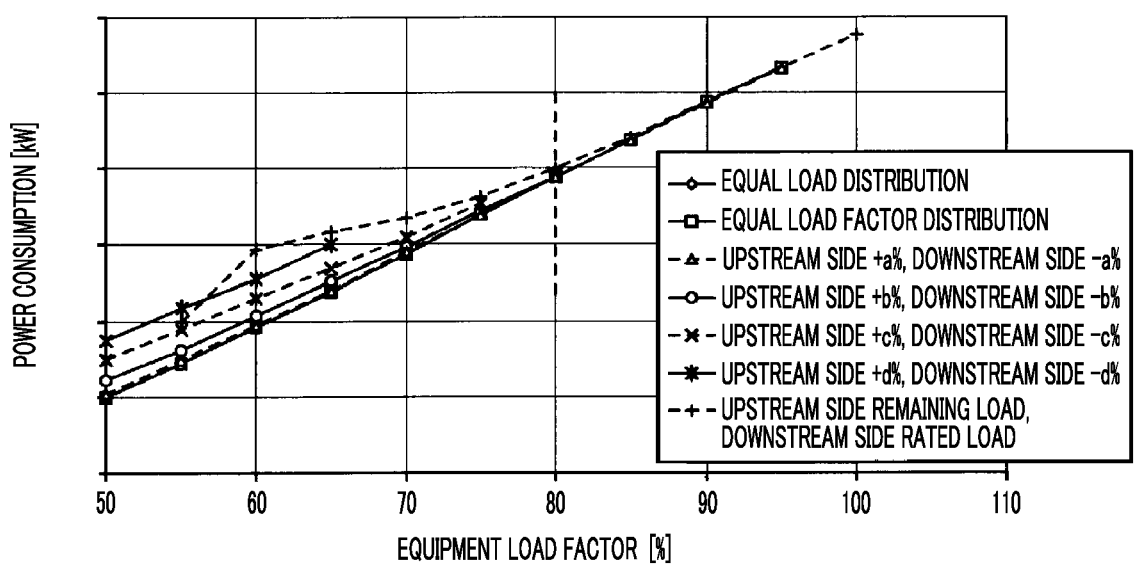
FIG. 14 is a graph showing a relationship between the load factor of the refrigerator, the equipment load factor, and the power consumption.
Figure 15:
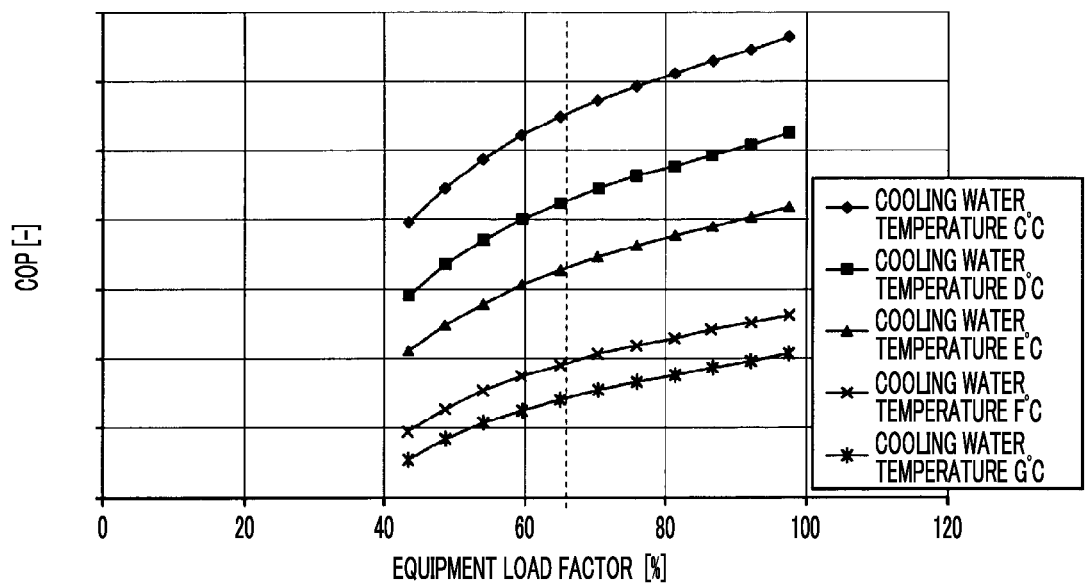
FIG. 15 is a graph showing a relationship between the equipment load factor and COP.
Figure 16:
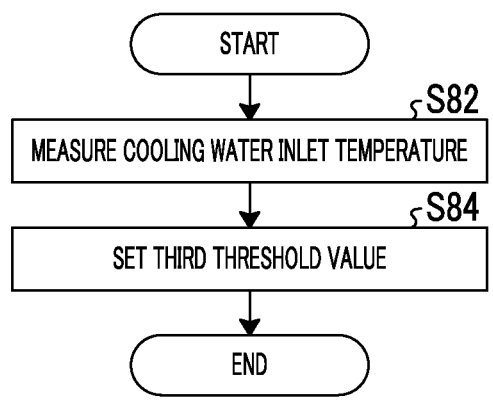
FIG. 16 is a flowchart showing an example of the processing operation of the refrigeration system.
Figure 17:
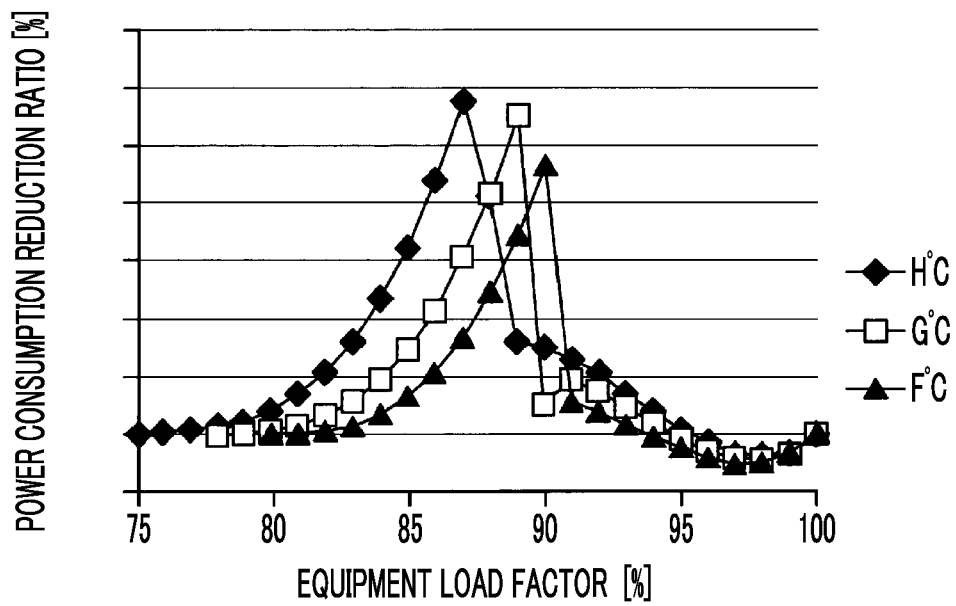
FIG. 17 is a graph showing a relationship between a power consumption reduction ratio and the equipment load factor.

FIG. 12 is a flowchart showing an example of the processing operation of the refrigeration system 10. FIG. 13 is an explanatory diagram for explaining the control of the load factor of the refrigerator. FIG. 14 is a graph showing a relationship between the load factor of the refrigerator, the equipment load factor, and the power consumption. FIG. 15 is a graph showing a relationship between the equipment load factor and COP. Here, FIG. 15 shows the relationship between the equipment load factor and the COP in cases where the cooling water inlet temperature is C° C., D° C., E° C., F° C., and G° C. The temperature rises in the order of C° C., D° C., E° C., F° C., and G° C. That is, C<D<E<F<G is satisfied. FIG. 16 is a flowchart showing an example of the processing operation of the refrigeration system 10. FIG. 17 is a graph showing a relationship between a power consumption reduction ratio and the equipment load factor.

In the present embodiment, the first compressor 101a of the upstream refrigerator 12 is the constant-speed device and the second compressor 101b of the downstream refrigerator 14 is the constant-speed device.

The higher-level control device 24 sets the mode to the first mode in which the upstream refrigerator 12 is operated and the downstream refrigerator 14 is stopped. As shown in FIG. 12, in a case where the equipment load factor exceeds the second threshold value in the first mode, the higher-level control device 24 starts the operation of the downstream refrigerator 14 and sets the mode to the second mode (Step S62). That is, in a case where the equipment load factor is equal to or more than the second threshold value which is higher than the first threshold value is in the state of the first mode in which where the upstream refrigerator 12 is operated and the downstream refrigerator 14 is stopped, the higher-level control device 24 sets the mode to the second mode in which both the upstream refrigerator 12 and the downstream refrigerator 14 are operated.

In a case where the second mode in which both the upstream refrigerator 12 and the downstream refrigerator 14 are operated is set, the higher-level control device 24 performs the operation with an equal load distribution (Step S64). That is, in a case where the equipment load factor exceeds the second threshold value in the first mode and the operation in the second mode starts, the higher-level control device 24 causes the loads of the upstream refrigerator 12 and the downstream refrigerator 14 to be the equal load.

Next, the higher-level control device 24 determines that the equipment load factor is equal to or more than the third threshold value in a state where the operation is performed with the equal load distribution (Step S66). The third threshold value is a higher value than the second threshold value.

In a case where the higher-level control device 24 determines that the equipment load factor is equal to or more than the third threshold value (Yes in Step S66), the higher-level control device 24 sets the load factor of the downstream refrigerator 14 to a constant load and variably sets the load factor of the upstream refrigerator 12 (Step S68). That is, in a case where the equipment load factor exceeds the third threshold value which is higher than the second threshold value in the state where both the upstream refrigerator 12 and the downstream refrigerator 14 are operated, the higher-level control device 24 increases the load factor of the upstream refrigerator 12 in a state where the load of the downstream refrigerator 14 is constantly maintained, according to an increase of the equipment load factor. The higher-level control device 24 sets the downstream refrigerator 14 to a constant load (rated load) and changes the load factor of the upstream refrigerator 12 according to the equipment load factor.

The higher-level control device 24 determines whether or not the load factor of the upstream refrigerator 12 becomes 100% in a state where the load factor of the downstream refrigerator 14 is set to a constant load and the load factor of the upstream refrigerator 12 is variably set (Step S70). In a case where the higher-level control device 24 determines that the load factor of the upstream refrigerator 12 is not 100% (No in Step S70), the step returns to Step S68.

In a case where the higher-level control device 24 determines that the load factor of the upstream refrigerator 12 is 100% (Yes in Step S70), the higher-level control device 24 variably sets the load of the downstream refrigerator 14 (Step S72). The higher-level control device 24 changes the load factor of the downstream refrigerator 14.

The higher-level control device 24 determines whether or not the load factor of the downstream refrigerator 14 is equal to or less than a constant load (Step S74). In a case where it is determined that the load factor of the downstream refrigerator 14 is equal to or less than the constant load (Yes in Step S74), the step returns to Step S68. In a case where it is determined that the load factor of the downstream refrigerator 14 is not equal to or less than the constant load (No in Step S74), the step returns to Step S74.

In Step S66, in a case where the higher-level control device 24 determines that the equipment load factor is not equal to or more than the third threshold value (No in Step S66), the step proceeds to Step S76. The higher-level control device 24 determines whether or not the equipment load factor is less than the first threshold value in the state of the second mode in which both the upstream refrigerator 12 and the downstream refrigerator 14 are operated (Step S76).

In Step S76, it is determined that the equipment load factor is lower than the first threshold value (Yes in Step S76), the higher-level control device 24 stops the downstream refrigerator 14 and sets the mode to the first mode (Step S78). In Step S76, in a case where it is determined that the equipment load factor is less than the first threshold value (No in Step S76), the higher-level control device 24 returns the step to Step S66.

The higher-level control device 24 performs the processing shown in FIG. 12, and thus, as shown in FIG. 13, the higher-level control device 24 performs the operation to change the load factor of each refrigerator according to an increase of the equipment load factor. The higher-level control device 24 operates only the upstream refrigerator 12 in a state where the equipment load factor is low. In this state, if the equipment load factor is equal to or more than the second threshold value, the higher-level control device 24 starts the operation of the downstream refrigerator 14. If the operations of two refrigerators start, the operations are performed at an equally distributed load. Since the loads of 100% of the upstream refrigerator 12 and the downstream refrigerator 14 are the same as each other, in a case where the same load as each other is distributed, the upstream refrigerator 12 and the downstream refrigerator 14 have the same load factor as each other. If the equipment load factor is equal to or more than the third threshold value (80% or more in the example shown in FIG. 13), the higher-level control device 24 variably sets the load factor of the downstream refrigerator 14 and adjusts the load factor of the downstream refrigerator 14.

The higher-level control device 24 performs the equal load distribution when the first mode in which the operation is performed by one refrigerator is switched to the second mode in which the operation is performed by two refrigerators, and thus, as shown in FIG. 14, it is possible to reduce the power consumption compared to a case where the downstream refrigerator 14 is set to the rated load and remaining loads are distributed to the upstream refrigerator 12. Here, FIG. 14 shows measurement results in cases where the load of the upstream refrigerator 12 and the load of the downstream refrigerator 14 have the equal load factor and are distributed with the equal load (the load is equally distributed). In addition, FIG. 14 shows measurement results in a case where the load of the downstream refrigerator 14 is the rated load and the remaining load is distributed to the load of the upstream refrigerator 12. In addition, FIG. 14 shows measurement results in a case where the load of the upstream refrigerator 12 is set to a load of which a difference with respect to the equal load becomes +a % and the load of the downstream refrigerator 14 is set to a load of which a difference with respect to the equal load becomes −a %, in a case where the load of the upstream refrigerator 12 is set to a load of which a difference with respect to the equal load becomes +b % and the load of the downstream refrigerator 14 is set to a load of which a difference with respect to the equal load becomes −b %, in a case where the load of the upstream refrigerator 12 is set to a load of which a difference with respect to the equal load becomes +c % and the load of the downstream refrigerator 14 is set to a load of which a difference with respect to the equal load becomes −c %, and in a case where the load of the upstream refrigerator 12 is set to a load of which a difference with respect to the equal load becomes +d % and the load of the downstream refrigerator 14 is set to a load of which a difference with respect to the equal load becomes −d %. A relationship between a %, b %, c %, and d % satisfies a %<b %<c %<d %.

Moreover, in a case where two refrigerators are constant-speed devices and in a case where the equipment load is equal to or more than a predetermined threshold value, the load is distributed to the upstream refrigerator 12 as much as possible, and thus, it is possible to reduce the power consumption. As shown in FIG. 15, if the equipment load factor is lower than the third threshold value (80% in the example shown in FIG. 15), a change of COP with respect to the refrigerator load factor becomes nonlinear, and thus, a decrease in efficiency with respect to the change of the refrigerator load factor becomes large. Accordingly, by increasing the loads of the both refrigerators by the equal load distribution until the two refrigerators reach the third threshold value, it is possible to improve efficiency. In addition, in the third threshold value or more where the change of COP becomes small, it is possible to improve efficiency by bringing the upstream refrigerator 12 which is more efficient close to the rated load in advance.

Preferably, the higher-level control device 24 adjusts the third threshold value based on the cooling water inlet temperature measured by the inlet cooling-water temperature measuring unit 28. As shown in FIG. 16, the higher-level control device 24 detects the cooling water inlet temperature measured by the inlet cooling-water temperature measuring unit 28 (Step S82) and sets the third threshold value based on the detected temperature (Step S84). The higher-level control device 24 stores a relationship between the cooling water inlet temperature and the equipment load factor and sets the third threshold value based on the cooling water inlet temperature. The third threshold value decreases as the cooling water inlet temperature increases. That is, as the temperature measured by the cooling-water temperature measuring unit 28 is higher, each of the third threshold value has a lower equipment load factor.

FIG. 17 is a graph showing the relationship between the equipment load factor and the power consumption reduction ratio in a case where the first compressor 101*a* of the upstream refrigerator 12 is the constant-speed device and the second compressor 101*b* of the downstream refrigerator 14 is the constant-speed device. Here, FIG. 17 shows the relationship between the equipment load factor and the power consumption reduction ratio in cases where the cooling water inlet temperature is F° C., G° C., and H° C. The temperature rises in the order of F° C., G° C., and H° C. That is, F<G<H is satisfied. According to the cooling water inlet temperature, it is determined whether or not to change the load distribution ratio from the equal load factor distribution to the upstream remaining loads and the downstream load limit. Reduction effects of the power consumption increase as the cooling water inlet temperature increases, and thus, in a case where the cooling water inlet temperature is high, the load distribution ratio is changed. The power consumption reduction ratio decreases in a case where the cooling water inlet temperature is low, and thus, the operation is performed by only the equal load factor distribution. As shown in FIG. 17, the equipment load factor becomes lower as the cooling water inlet temperature measured by the inlet cooling-water temperature measuring unit 28 is higher.

REFERENCE SIGNS LIST

10: refrigerator system
12: upstream refrigerator
14: downstream refrigerator
18: load equipment
20: cooling water circulation system
22: cold water circulation system
24: higher-level control device
24*a*: operating refrigerator number determination unit
24*b*: load distribution determination unit
26: cold-water intermediate temperature measuring unit
28: inlet cooling-water temperature measuring unit
101: compressor
101*a*: first compressor
101*b*: second compressor
102: condenser
102*a*: first condenser
102*b*: second condenser
103: evaporator
103*a*: first evaporator
103*b*: second evaporator
104: intermediate cooler
106: circulation path
106*a*: first circulation path
106*b*: second circulation path
107: expansion valve
108: expansion valve
109: controller
111: electric motor
112: compression portion
121: cooling water pipe
122: pump
123: cooling water supply portion
131: cold water pipe
132: pump
136*a*: refrigerant pipe
136*b*: refrigerant pipe
136*c*: refrigerant pipe

The invention claimed is:

1. A refrigerator system, comprising:

an upstream refrigerator having a first compressor which compresses a refrigerant of the upstream refrigerator, a first condenser which condenses the refrigerant of the upstream refrigerator compressed by the first compressor, a first intermediate cooler that separates the refrigerant of the upstream refrigerator condensed by the first condenser into a liquid-phase refrigerant of the upstream refrigerator and a gas-phase refrigerant of the upstream refrigerator, and supplies the gas-phase refrigerant of the upstream refrigerator to the first compressor, and a first evaporator which evaporates the liquid-phase refrigerant of the upstream refrigerator from the first intermediate cooler to cool cold water and then supplies the evaporated refrigerant of the upstream refrigerator to the first compressor;

a downstream refrigerator having a second compressor which compresses a refrigerant of the downstream refrigerator, a second condenser which condenses the refrigerant of the downstream refrigerator compressed by the second compressor, the first condenser receiving a cooling water from the second condenser, a second intermediate cooler that separates the refrigerant of the downstream refrigerator condensed by the second condenser into a liquid-phase refrigerant of the downstream refrigerator and a gas-phase refrigerant of the downstream refrigerator, and supplies the gas-phase refrigerant of the downstream refrigerator to the second compressor, and a second evaporator which evaporates the liquid-phase refrigerant of the downstream refrigerator from the second intermediate cooler to cool cold water from the first evaporator and then supplies the evaporated refrigerant of the downstream refrigerator to the second compressor; and a processor which controls operations of the upstream refrigerator and the downstream refrigerator between a first mode, in which only the upstream refrigerator is operated, and a second mode, in which both the upstream refrigerator and the downstream refrigerator are operated, and sets loads of the upstream refrigerator and the downstream refrigerator, wherein the first compressor of the upstream refrigerator is a variable-speed device, wherein the second compressor of the downstream refrigerator is a constant-speed device, wherein the processor sets the first mode when an equipment load factor is smaller than a first threshold value, and sets the second mode when the equipment load factor is equal to or more than a second threshold value which is higher than the first threshold value, and wherein the processor switches from the second mode to the first mode when the equipment load factor is lower than the first threshold value.

2. The refrigerator system according to claim 1, wherein, in the second mode, the processor sets the upstream refrigerator and the downstream refrigerator to loads such that differences of the set loads with respect to an equal load are within 10%.

3. The refrigerator system according to claim 1, wherein, in the second mode, the processor sets the upstream refrigerator and the downstream refrigerator to an equal load.

4. The refrigerator system according to claim 1, wherein the second condenser performs heat exchange between supplied cooling water and the refrigerant of the downstream refrigerator to cool the refrigerant of the downstream refrigerator, and wherein the first condenser performs heat exchange between the cooling water from the second condenser and the refrigerant of the upstream refrigerator to cool the refrigerant of the upstream refrigerator.

5. The refrigerator system according to claim 1, wherein, in the second mode, when the equipment load factor exceeds a third threshold value which is higher than the second threshold value, the second mode is maintained, and a load factor of the upstream refrigerator increases according to an increase in the equipment load factor.

6. The refrigerator system according to claim 5, wherein the second condenser performs heat exchange between supplied cooling water and the refrigerant of the downstream refrigerator to cool the refrigerant of the downstream refrigerator, and wherein the first condenser performs heat exchange between the cooling water from the second condenser and the refrigerant of the upstream refrigerator to cool the refrigerant of the upstream refrigerator.

* * * * *